(12) United States Patent
Thorson et al.

(10) Patent No.: US 9,972,343 B1
(45) Date of Patent: May 15, 2018

(54) MULTI-STEP VALIDATION OF WAKEUP PHRASE PROCESSING

(71) Applicant: Republic Wireless, Inc., Raleigh, NC (US)

(72) Inventors: Dean Thorson, Grayslake, IL (US);
Jared Kashimba, Micanopy, FL (US);
Matthew Newton, Park Ridge, IL (US);
Justin Milam, Burgaw, NC (US)

(73) Assignee: Republic Wireless, Inc., Raleigh, NC (US)

( * ) Notice: Subject to any disclaimer, the term of this patent is extended or adjusted under 35 U.S.C. 154(b) by 0 days. days.

(21) Appl. No.: 15/864,047

(22) Filed: Jan. 8, 2018

(51) Int. Cl.
*G10L 15/20* (2006.01)
*G10L 25/84* (2013.01)
*G10L 15/22* (2006.01)
*G10L 15/30* (2013.01)
G10L 25/78 (2013.01)
G10L 15/08 (2006.01)

(52) U.S. Cl.
CPC .............. *G10L 25/84* (2013.01); *G10L 15/08* (2013.01); *G10L 15/22* (2013.01); *G10L 15/30* (2013.01); *G10L 2015/088* (2013.01); *G10L 2025/783* (2013.01)

(58) Field of Classification Search
CPC ............................................ H04W 52/0251
USPC ................ 704/200–226, 230–257, 270–275
See application file for complete search history.

(56) References Cited

U.S. PATENT DOCUMENTS

2014/0358552 A1* 12/2014 Xu ................................ 704/275
2016/0171976 A1* 6/2016 Sun ................... H04W 52/0251
704/233

* cited by examiner

*Primary Examiner* — Huyen Vo
(74) *Attorney, Agent, or Firm* — Gregory Stephens

(57) ABSTRACT

Various embodiments describe a multi-step process for determining whether the keyword has been spoken. The first tier uses an onboard digital signal processor (DSP) to process converted audio signals. If the DSP analysis cannot confirm the keyword due to noise in the signal, a second tier of processing may use an applications processor (AP) and a more stringent audio filter to try to verify the keyword. If the AP analysis cannot confirm the keyword, a third tier of processing may use server side processor and an even more stringent audio filter to try to verify the keyword. Certain signal to noise ratios (SNRs) of the detected and converted audio signal are used to decide when and if to try the second and third tier of processing.

15 Claims, 2 Drawing Sheets

100

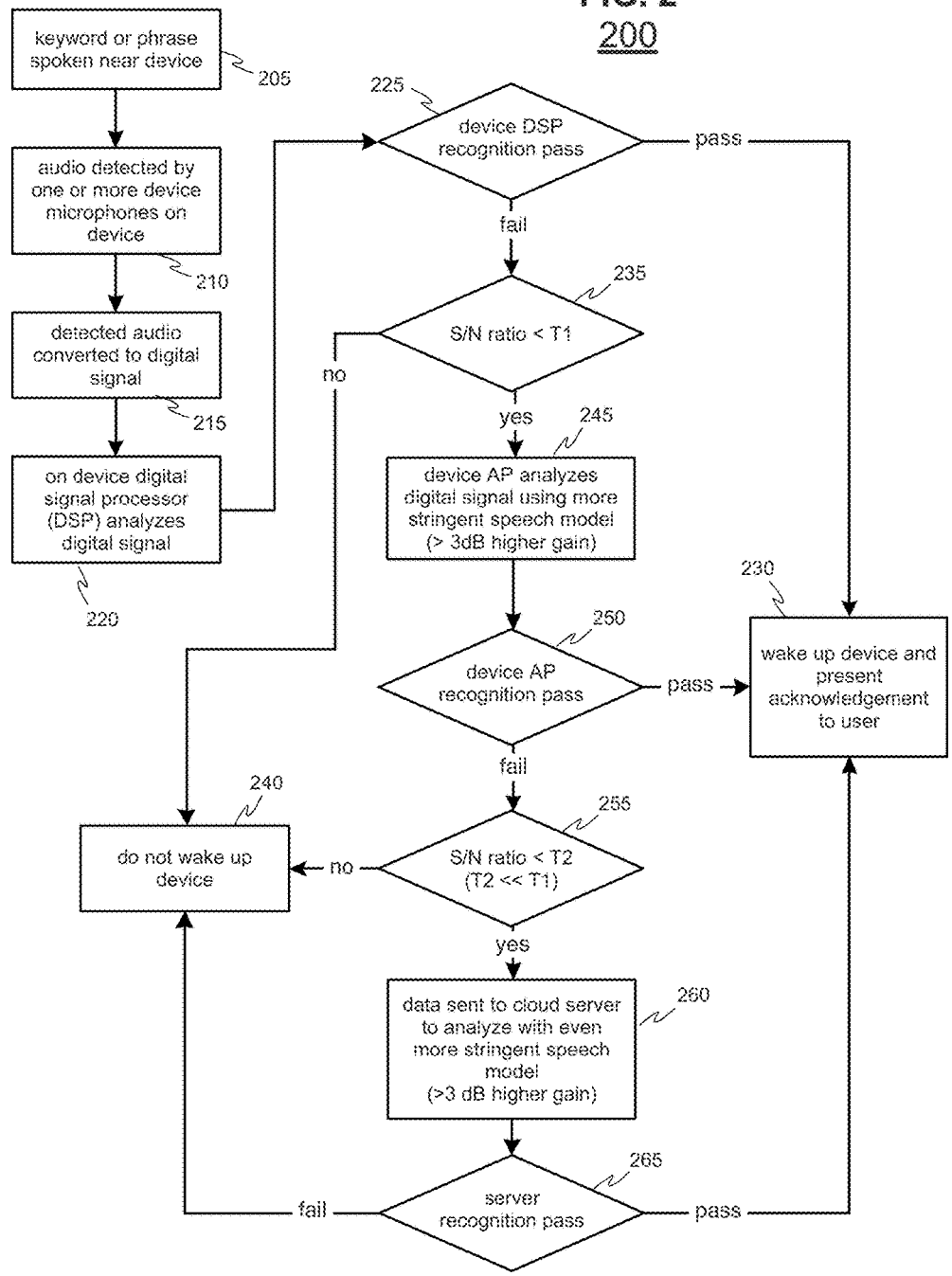

MULTI-STEP VALIDATION OF WAKEUP PHRASE PROCESSING

BACKGROUND

Many devices exist today that are voice activated. These devices range from smartphones to home appliances. A typical device that is voice activated will remain in a semi-dozed state until it recognizes a specific keyword or phrase. Often, this keyword or phrase may be difficult to discern based on the volume and/or articulation of the speaker.

What is needed is a technique to provide a more robust recognition of a keyword or phrase when it is spoken.

BRIEF DESCRIPTION OF THE DRAWINGS

FIG. 2 illustrates an embodiment of a first logic flow.

DETAILED DESCRIPTION

Figure 1:
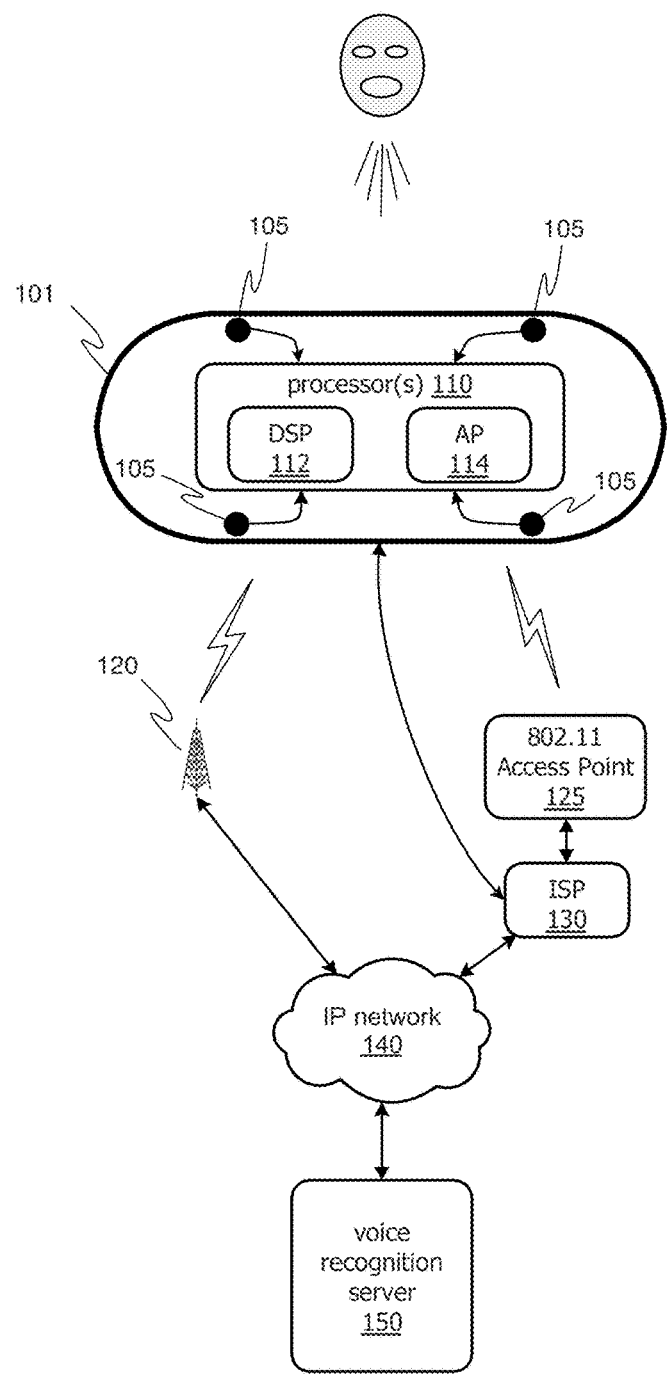
FIG. 1 illustrates an embodiment of a first networked environment for a keyword responsive electronic device.

Embodiments described herein may be directed to techniques for providing keyword or key phrase recognition. For simplicity's sake, the term 'keyword' will be used throughout this disclosure to refer to both a single word as well as a phrase comprised of multiple words. Thus, the term keyword shall be construed to refer to both a single word and a grouping of words.

The systems, devices, and methods described herein may be embodied in and performed by telecommunication endpoint devices, telecommunications network servers, other computer devices including combinations thereof, and software instructions executed by some or all of such devices, as will be explained in detail below.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 illustrates an embodiment of an operating environment 100 that may be representative of various embodiments. Operating environment 100 may include a communications device 101. The term communications device 101 may be used to describe a multifunctional device capable of inbound and/or outbound telecommunications, or smart speaker functions, among others. More generally, communications device 101 may describe any device that can be voice activated through the use of a keyword or phrase.

The communications device 101 may further comprise one or more microphone sensors 105 distributed on or about the communications device 101. Within the communications device 101, there may be one or more processors 110 including a digital signal processor (DSP) 112 and an applications processor (AP) 114.

A digital signal processor (DSP) is a specialized microprocessor, with its architecture optimized for the operational needs of digital signal processing. Generally speaking, DSPs measure, filter, or compress continuous real-world analog signals. Most general-purpose microprocessors can also execute digital signal processing algorithms successfully, but a dedicated DSP has better power efficiency and battery management making them more suitable in portable devices such as mobile phones or other portable communication devices.

An applications processor (AP) may be characterized as a system on a chip (SoC) designed to support applications running in a mobile operating system environment. An applications processor may provide a self-contained operating environment that delivers all system capabilities needed to support a device's applications, including memory management, graphics processing and multimedia decoding. Thus, it is more robust than a specialized DSP but also consumes much more power.

The communications device 101 may also include additional hardware/firmware/software to enable communication interfaces to exchange data with larger networks like the local area networks (LANs), wide area networks (WANs), and the Internet. For example, a communication device 101 may communicate with the Internet over one or more network access points. The communication device 101 may include an Ethernet network interface module allowing an Ethernet cable to connect the communication device 101 to a modem providing Internet access via an Internet Service Provider (ISP) 130. The communication device may also include an 802.11 chip capable of wireless data exchanges with an 802.11 access point 125 that is connected with the modem for the ISP 130. Communication device 101 may also include a cellular chip for cellular based communications using a wireless IP protocol, such as, but not limited to, LTE. Communication device 101 may communicate directly with a cellular tower/basestation 120. Each of the above modes, Ethernet, 802.11 WiFi, and cellular may provide access to a larger IP network 140 such as, for instance, the Internet. This access may then provide further access to other resources connected via the Internet like a voice recognition server 150.

Using the architecture of FIG. 1, a user may speak a keyword in the presence of a communication device 101. The communication device 101 may then attempt to recognize the spoken keyword in a structured multi-step fashion to wake up the communication device 101 and place it in a state ready to receive further voice commands. The embodiments describe a three-tiered multi-step process for determining whether the keyword has been spoken. The first tier uses the DSP 112 to process converted audio signals. The DSP 112 of communication device 101 remains active and listens for the spoken keyword. DSP 112 consumes less power than the AP 114 so keeping it semi-awake is not as big a drain on battery resources. If the DSP 112 analysis cannot confirm the keyword due to noise in the signal, it may be possible to use the AP 114 to verify the keyword.

To warrant use of the AP 114, the signal to noise ratio (SNR) of the signal must be below a first threshold (T1). One example, but not the only, of a threshold SNR may be 6 dB. The idea is that if the DSP could not match a keyword based on a converted speech signal having an SNR above the first threshold, then the speech signal can be confidently rejected without further processing. But, if the SNR is less than 6 dB, it may still be possible to match the converted speech signal to the keyword using additional processing and a more stringent filter. This additional processing may exceed the capabilities of DSP 112 but not the AP 114.

The AP 114 processing and analysis of the converted speech signal will yield either a pass or fail result. If the result is 'fail', there may still be one last option available. A third tier of analysis may be performed by a server side processor 150 that is distinct from the communication device 101. The server side processor 150 may have even more processing power than the AP 114 and may be able to execute the most stringent of filters to analyze the converted speech signal. To invoke the server-side processor 150 for keyword matching, certain conditions must be met. First, the SNR of the converted speech signal must be lower than a second threshold (T2). A non-limiting example of a T2 SNR threshold may be 3 dB. The logic is similar as to that described above. Specifically, T2 may be set so that any SNR above it should have been processed accurately by the AP 114 but SNR levels below may require the most stringent filtering to detect a keyword match.

FIG. 2 illustrates an exemplary logic flow 200 according to an embodiment. The logic flow 200 may be representative of some or all of the operations executed by one or more embodiments described herein for recognizing a spoken keyword in a multi-step fashion so as to wake up the communication device 101 and place it in a state ready to receive further voice commands. Further, the logic flow 200 may be performed by circuitry and one or more components discussed herein, such as those shown in FIG. 1.

The logic flow 200 process may begin when a keyword or other audio is spoken in proximity of the communication device 101 at step 205. The audio may be detected by one or more microphones 105 on communication device 101 at step 210 and converted from an analog signal to a digital signal at step 215.

The DSP 112 is always awake, albeit in a low power state so as not to be a significant drain on battery resources. The converted digital signals from step 215 may then be fed to the DSP 112 for analysis at step 220. The DSP 112 has been programmed to recognize one or more keywords. The DSP 112 may perform a first recognition pass analysis on the detected audio to determine if it matches the keyword at decision step 225. The DSP may pass the keyword if it satisfies one or more filters and thresholds that indicate a high probability of a keyword match at decision step 225. The thresholds may be intentionally set to be restrictive to eliminate or reduce the chances of the communication device 101 waking up when it should not, resulting in a false positive. If the result of decision step 225 is 'pass', it may cause the communication device 101 to fully wake up and present an acknowledgement to the user of its new state at step 230. The acknowledgement may take a visual form such as a light indicator, an audible form such as a tone emitted, or some combination of visual and audible.

If the recognition test of decision step 230 does not pass it is considered a fail. Sometimes, however, the recognition test may fail due to very high pass criteria yet the detected audio may still be the proper keyword. This may be referred to as a false negative. False negatives may be frustrating to users because they believe the communication device 101 failed to recognize the keyword they spoke and they may have to try again. When the initial DSP recognition test does fail, the audio may be subjected to further analysis to determine if there was a false negative. The digital signal is analyzed in another decision step 235 to determine whether the signal to noise (SNR) ratio was below a threshold (T1). The threshold may be chosen so as to balance additional processing with unnecessary additional processing because the additional processing may be performed by the applications processor 114 that requires more power consumption. One example of a threshold SNR ratio may be 6 dB meaning the audio that failed the initial DSP test must have an SNR less than 6 dB to warrant additional processing by the applications processor 114. If the SNR of the audio signal is greater than 6 dB, the communications device 101 will not wake up.

If the SNR of the audio signal is below the 6 dB threshold, the AP 114 may then analyze the digital signal using a more stringent speech model at step 245. The AP 114 may have more memory and processing power than the DSP 112 and can execute a more stringent speech model by filtering signals that have lower SNRs. The more complex speech model may be able to remove or filter out additional noise within the signal. Following the additional processing by the AP 114 in step 245, the result may be either pass or fail. If the result is 'pass', it may cause the communication device 101 to fully wake up and present an acknowledgement to the user of its new state at step 230. If the result is 'fail', there may be one more tier of processing that involves sending the digital signal over a network connection to a server processor 150 that may be able to apply an even more stringent filter to the digital signal. However, before sending the digital signal to the server processor 150, the signal is evaluated in decision step 255 to make sure it is below a second SNR threshold (T2) where T2<<T1. For example, if T1 were 6 dB, T2 could be on the order of 3 dB. The T2 threshold ensures that digital signals with high enough SNRs that the AP 114 should have successfully processed are not sent to the server processor 150 as it would likely be a waste of time and resources. If the SNR is above T2, the communications device 101 will not wake up and the entire process for the last keyword attempt may be terminated at step 240.

If the SNR is below T2, the signal may be sent to the server processor 150 in step 260 using one of the network interfaces previously described. The server processor 150 may then apply even more stringent filters and algorithms to the keyword data in step 260. If the result of the server filtering leads to a 'pass' result in decision step 265, the server may relay the 'pass' result back to the communication device 101 and cause it to fully wake up and present an acknowledgement to the user of its new state at step 230. If the result of the server filtering leads to a 'fail' result in decision step 265, the server may relay the 'fail' result back to the communication device 101 and cause it not to wake up at step 240.

For phase 1 DSP 112 processing, only the DSP 112 on the device is awake. This initial method requires the least power and gets to a pass result with the least amount of delay from when the keyword was spoken. For phase 2 AP 114 processing, a small subset of the overall communications device 101 is awake resulting in more power consumption than phase 1 DSP 112 processing. AP processing 114 also introduces an additional delay in getting to a pass result. For phase 3 server processing, there are additional costs in power consumption and the use of network resources. Phase 3 server processing also introduces the longest delay between spoken keyword and final determination of pass result.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or rewriteable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. A method of verifying a spoken keyword for a voice enabled communication device, comprising:
   detecting, via at least one microphone sensor, an analog audio signal indicative of a spoken word or phrase;
   converting the detected analog audio signal to a digital signal;
   inputting the digital signal to a digital signal processor (DSP) within the communication device for processing to determine a signal to noise ratio (SNR) of the digital signal and whether the digital signal matches a known keyword;
   when the DSP processing determines the digital signal matches the known keyword, causing the communication device to wake up and present an acknowledgement;
   when the DSP processing could not positively determine that the digital signal matches the keyword, determining whether the SNR of the digital signal exceeds a first SNR threshold (T1) and, if so, causing the communication device to remain in a sleep state, and, if not, inputting the digital signal to an applications processor (AP) on the communications device for more stringent processing to determine if the digital signal matches the known keyword;
   when the AP processing determines the digital signal matches the known keyword, causing the communication device to wake up and present an acknowledgement;
   when the AP processing could not positively determine that the digital signal matches the keyword, determining whether the SNR of the digital signal exceeds a second SNR threshold (T2), where T2 is less than T1, and, if so, causing the communication device to remain in the sleep state, and, if not, sending the digital signal to a server processor for even more stringent analysis to determine if the digital signal matches the known keyword; and receiving a pass or fail result from the server processor wherein if the result is fail, causing the communication device to remain in the sleep state and if the result is pass, causing the communication device to wake up and present an acknowledgement.

2. The method of claim 1, wherein the acknowledgement presented by the communication device is an audible tone.

3. The method of claim 1, wherein the acknowledgement presented by the communication device is a visual light indicator.

4. The method of claim 1, wherein the T1 threshold is 6 dB.

5. The method of claim 4, wherein the T2 threshold is 3 dB.

6. A communication device, comprising:
a memory; and
logic, at least a portion of which is implemented in circuitry coupled to the memory, the logic to:
   detect, via at least one microphone sensor, an analog audio signal indicative of a spoken word or phrase;
   convert the detected analog audio signal to a digital signal;
   input the digital signal to a digital signal processor (DSP) within the communication device for processing to determine a signal to noise ratio (SNR) of the digital signal and whether the digital signal matches a known keyword;
   when the DSP processing determines the digital signal matches the known keyword, cause the communication device to wake up and present an acknowledgement;
   when the DSP processing could not positively determine that the digital signal matches the keyword, determine whether the SNR of the digital signal exceeds a first SNR threshold (T1) and, if so, cause the communication device to remain in a sleep state, and, if not, input the digital signal to an applications processor (AP) on the communications device for more stringent processing to determine if the digital signal matches the known keyword;
   when the AP processing determines the digital signal matches the known keyword, cause the communication device to wake up and present an acknowledgement;
   when the AP processing could not positively determine that the digital signal matches the keyword, determine whether the SNR of the digital signal exceeds a second SNR threshold (T2), where T2 is less than T1, and, if so, cause the communication device to remain in the sleep state, and, if not, send the digital signal to a server processor for even more stringent analysis to determine if the digital signal matches the known keyword; and
   receive a pass or fail result from the server processor wherein if the result is fail, cause the communication device to remain in the sleep state and if the result is pass, cause the communication device to wake up and present an acknowledgement.

7. The communication device of claim 6, wherein the acknowledgement presented by the communication device is an audible tone.

8. The communication device of claim 6, wherein the acknowledgement presented by the communication device is a visual light indicator.

9. The communication device of claim 6, wherein the T1 threshold is 6 dB.

10. The communication device of claim 9, wherein the T2 threshold is 3 dB.

11. At least one non-transitory computer-readable medium comprising a set of instructions that, in response to being executed by a processor circuit, cause the processor circuit to:
   detect, via at least one microphone sensor, an analog audio signal indicative of a spoken word or phrase;
   convert the detected analog audio signal to a digital signal;
   input the digital signal to a digital signal processor (DSP) within the communication device for processing to determine a signal to noise ratio (SNR) of the digital signal and whether the digital signal matches a known keyword;
   when the DSP processing determines the digital signal matches the known keyword, cause the communication device to wake up and present an acknowledgement;
   when the DSP processing could not positively determine that the digital signal matches the keyword, determine whether the SNR of the digital signal exceeds a first SNR threshold (T1) and, if so, cause the communication device to remain in a sleep state, and, if not, input the digital signal to an applications processor (AP) on the communications device for more stringent processing to determine if the digital signal matches the known keyword;
   when the AP processing determines the digital signal matches the known keyword, cause the communication device to wake up and present an acknowledgement;
   when the AP processing could not positively determine that the digital signal matches the keyword, determine whether the SNR of the digital signal exceeds a second SNR threshold (T2), where T2 is less than T1, and, if so, cause the communication device to remain in the sleep state, and, if not, send the digital signal to a server processor for even more stringent analysis to determine if the digital signal matches the known keyword; and
   receive a pass or fail result from the server processor wherein if the result is fail, cause the communication device to remain in the sleep state and if the result is pass, cause the communication device to wake up and present an acknowledgement.

12. The at least one non-transitory computer-readable medium of claim 11, wherein the acknowledgement presented by the communication device is an audible tone.

13. The at least one non-transitory computer-readable medium of claim 11, wherein the acknowledgement presented by the communication device is a visual light indicator.

14. The at least one non-transitory computer-readable medium of claim 11, wherein the T1 threshold is 6 dB.

15. The at least one non-transitory computer-readable medium of claim 14, wherein the T2 threshold is 3 dB.

* * * * *